United States Patent [19]

Meyers

[11] Patent Number: 5,742,431
[45] Date of Patent: Apr. 21, 1998

[54] CATADIOPTRIC LENS SYSTEM INCORPORATING DIFFRACTIVE ACHROMATIZATION

[75] Inventor: Mark M. Meyers, Hamlin, N.Y.

[73] Assignee: Eastman Kodak Company, Rochester, N.Y.

[21] Appl. No.: 414,075

[22] Filed: Mar. 30, 1995

[51] Int. Cl.$^6$ .............. G02B 27/44; G02B 5/18; G02B 17/00; G03B 17/02
[52] U.S. Cl. .............. 359/565; 359/566; 359/366; 396/535
[58] Field of Search .............. 359/1, 15, 565, 359/566, 572, 569, 355, 728, 366, 723; 396/535

[56] References Cited

U.S. PATENT DOCUMENTS

| | | | |
|---|---|---|---|
| 648,748 | 5/1900 | Ives | 359/566 |
| 3,438,695 | 4/1969 | Matsui . | |
| 3,580,679 | 5/1971 | Perkin | 359/723 |
| 4,790,637 | 12/1988 | Mercado . | |
| 4,881,804 | 11/1989 | Cohen | 359/565 |
| 5,042,928 | 8/1991 | Richards . | |
| 5,148,314 | 9/1992 | Chen . | |
| 5,175,651 | 12/1992 | Marron et al. | 359/566 |
| 5,285,314 | 2/1994 | Futhey | 359/565 |
| 5,349,471 | 9/1994 | Morris et al. . | |
| 5,440,669 | 8/1995 | Rakubic et al. | 359/7 |
| 5,442,480 | 8/1995 | Swanson et al. | 359/355 |
| 5,543,966 | 8/1996 | Meyers | 359/565 |

OTHER PUBLICATIONS

Principals of Optics–Born and Wolf—p. 155.
Modern Lens Design–Warren Smith –16.1.

*Primary Examiner*—Paul M. Dzierzynski
*Assistant Examiner*—Audrey Chang
*Attorney, Agent, or Firm*—Svetlana Z. Short

[57] ABSTRACT

A catadioptric lens system may be operated in the telephoto mode to allow images of distant objects to be formed with large image plane magnification and be part of a camera body wherein a rear reflective section of the catadioptric lens system is provided by a front face of the camera body which has a clear aperture centered about the optical axis. An image is focused at the film plane. The catadioptric lens system has a diffractive/refractive hybrid singlet lens which corrects off-axis aberrations and decreases the overall lens length. The front surface of the lens defines an asphere. The back surface has a diffractive lens with annular blazed zones. The back surface also has an inner portion which is reflective and may have the same curvature as the transmissive section of the singlet (the back surface base curve of the from which the blazed zones extend). The lens system provides catadioptric imaging (sometimes called contracurrent or katoptric imaging) at the film plane.

13 Claims, 1 Drawing Sheet

CATADIOPTRIC LENS SYSTEM INCORPORATING DIFFRACTIVE ACHROMATIZATION

FIELD OF INVENTION

The present invention relates to achromatized catadioptric lens systems with diffractive achromatization, and particularly to a camera having a body, the front surface of which provides the rear reflector of the catadioptric lens system and which can be operated in telephoto mode.

The invention is especially suitable for use in single use cameras and provides such cameras with a catadioptric lens including a hybrid, refractive/diffractive asphere for achromatization and reduced abberations for off axis segments of the image. Both the hybrid lens and the camera body may be molded from plastic material in the interest of cost reduction.

Catadioptric lenses require achromatization of the refractive portions thereof, as well as compensation for different path lengths for rays entering the front of the lens system from the image side at different radial distances from the optical axis of the lens system. For achromatization (axial color correction), a two element achromats composed of positive and negative lenses, made with two glasses with different Abbe numbers has been utilized. See Matsui U.S. Pat. No. 3,438,695 issued Apr. 15, 1969 and Section 16.3 of the text, *Modern Lens Design* by Warren Smith. In order to correct for different path lengths across the aperture of a catadioptric optical system, the lens elements have been fabricated to provide different thickness of glass (or plastic) across their aperture, by removal of material to compensate for phase shifts across the aperture. See Richards U.S. Pat. No. 5,042,928 issued Aug. 27, 1991.

It has been proposed to provide refractive/diffractive hybrid achromats to achromatize a lens system. See Morris, et al. U.S. Pat. No. 5,347,471, issued Sep. 20, 1994 and Chen, U.S. Pat. No. 5,148,314, issued Sep. 15, 1992 issued Sep. 15, 1992 (see also patent application Ser. No. 08/175,708, filed Dec. 29, 1993 in the name of applicant Mark M. Meyers.

SUMMARY OF INVENTION

The present invention utilizes the principles of the refractive/diffractive hybrid to provide a catadioptric lens system with diffractive achromatization for the diffractive section of the catadioptric while the reflective elements are already achromatic. The diffractive lens also may be designed to incorporate aspheric coefficients which produce sufficient phase shift across the aperture of the system to correct for optical path length variations. The invention, therefore, provides a lens system which affords high image quality and is compact. The system may be designed to provide a long focal length, which is especially useful when to enable operation in the telephoto mode. In addition, a camera body and a section of the hybrid refractive/diffractive element of the system may be provided with reflective sections which face each other so as to permit a compact design especially suitable for use in a camera.

It is an object of the present invention to provide an improved catadioptric lens system and/or a camera incorporating and being an integral part of the lens system. The lens system and the camera may have one or more of the features and advantages discussed above, as well as other features which arise out of a design incorporating the invention.

Briefly described, a catadioptric lens system embodying the invention has an optical axis and utilizes a refractive/diffractive hybrid achromat lens disposed along the axis. A camera body has a reflective surface with a clear aperture centered on the axis which provides the rear reflective section of the lens system. The hybrid lens rear surface faces and is spaced from the back surface of the achromat and has inner and outer portions which are light reflective and transmissive. The curvatures of the reflective surface of the body and the reflective inner portion of the achromat back surface, as well as the curvatures of the front and rear surface of the achromat and the diffractive portion define a focus of the lens system along the optical axis at the image plane. The body may be a camera body with a back side along which the film may travel in the object plane (the film plane). The front surface of the achromat may be an asphere which, together with the diffractive lens, controls the phase or optical path length via the lens system. The inner surface may also be fabricated as a bump or indentation in the center of the achromat so as to bring the image to focus at the object plane. The lens System provides catadioptric imaging, which is sometimes called contracurrent or katoptric imaging.

BRIEF DESCRIPTION OF DRAWINGS

The foregoing and other features, objects and advantages of the invention, as well as a presently preferred embodiment thereof will be more apparent from a reading of the following description in connection with the accompanying drawings in which.

DESCRIPTIONS OF PREFERRED EMBODIMENT

Figure 1:
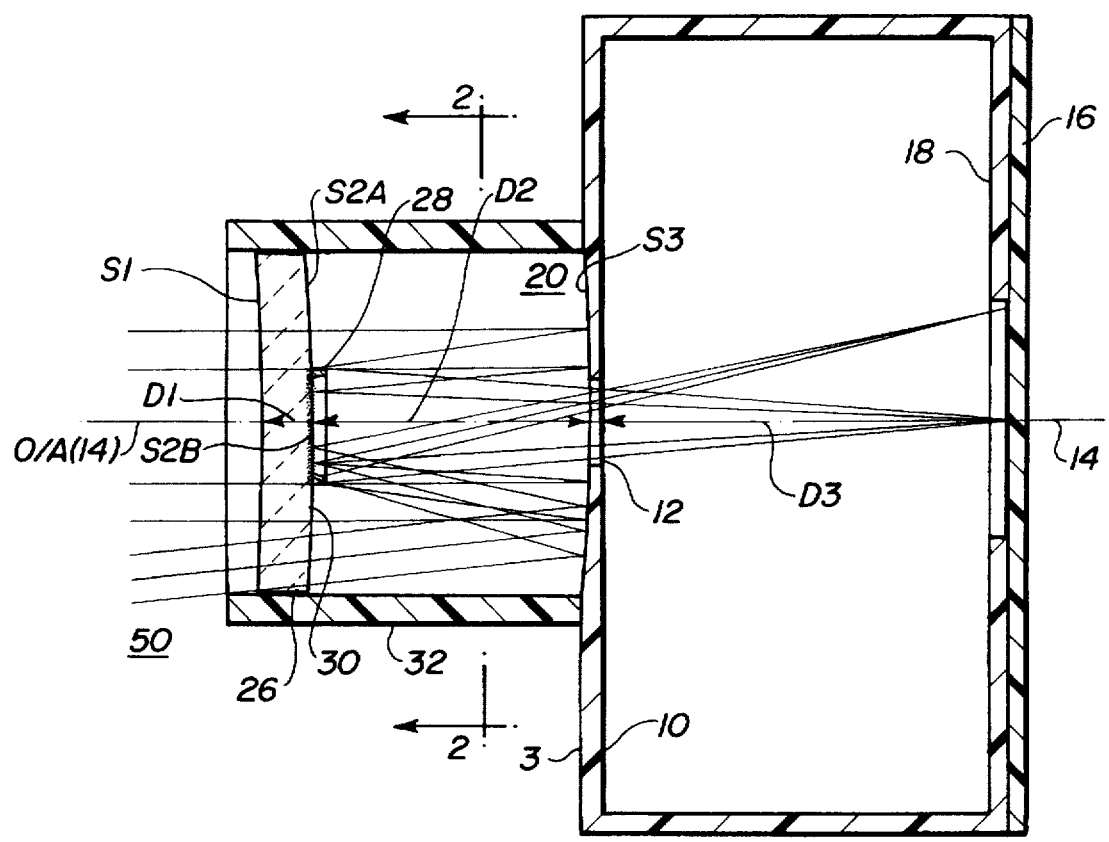
FIG. 1 is a schematic front view of a camera with a catadioptric lens system having diffractive achromatization and phase control in accordance with the invention.
Figure 2:
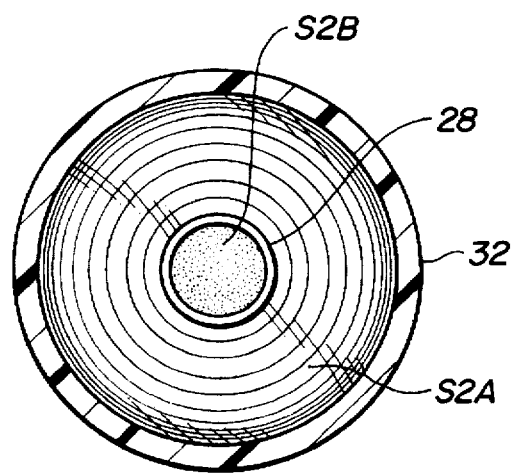
FIG. 2 is a sectional view, taken along line 2—2, of the refractive/diffractive lens looking towards its inner surface.

Referring to the drawings, there is shown a camera body 10 having a front surface 3 with a concave reflective surface S3 which is circular in cross-section and has a clear aperture 12. The clear aperture and the reflective surface are radially symmetrical about an optical axis 14. The back 16 of the camera body 10 has an inner surface 18 along which film can be transported, such that the film surface defines a film plane in the camera body 10. The film and its transport mechanism may be conventional and, therefore, is not shown herein.

The body has a width D3 which may be considered the back focal length of a catadioptric lens system 20 made up of the reflective surface S3 as a reflector section thereof and another reflective surface S2B which may be a spherical surface. The surface is shown as concave in the backwards direction, towards the film plane, but may be convex (an indentation in the convex surface S2A). The surface S2A is the outer portion of a hybrid singlet lens 26. This singlet 26 and the camera body may be made of plastic. The plastic of the singlet may be acrylic in the interest of low cost. Both the camera body 10 and the singlet 26 may be molded of plastic material, such as acrylic. The lens 26 is in a cylindrical barrel 32 mounted on camera body 10.

The inner surface S2B and the outer surface S2A may both be spherical. The front surface S1 of the singlet 26 may be a surface where light from the image is refracted and may be a refractive asphere. The inner and outer portions of the back surface of the singlet are separated by a flare shield, in the form of a cylindrical ring 28.

The singlet 26 has on the outer portion (around the surface S2B or inner portion) a diffractive surface which defines a diffractive lens (DOE) 30. This lens may be made up of annular zones and may be blazed in order to provide high diffraction efficiency.

The ray paths shown in FIG. 1 illustrate the focusing power of the lens system 20 and its ability to form an image over an area larger than the clear aperture 12.

The reflective surfaces S2B and S3 may be provided by reflective coatings which may be metal (aluminum or silver) which is electro deposited or sputtered onto the surfaces.

By way of example, a suitable design of the lens system is given below.

selves to those skilled in the art. Accordingly, the foregoing description should be taken as illustrative and not in a limiting sense.

I claim:

1. A combination of a camera body and a catadioptric lens system having an optical axis, which combination comprises from an object side: a frontmost refractive/diffractive achromat disposed along said axis and having first and second surfaces facing in first and second directions which are opposite to each other along said axis, a a reflective third surface formed on said camera body, said reflective third surface being defined by a curved section in a wall of said

TABLE

| SRF | RADIUS | THICKNESS | | APERTURE RADIUS | MATL. | |
|---|---|---|---|---|---|---|
| 0 | — | 1.0000e + 10 | | 1.0250e + 09 | AIR | |
| S1 | −370.344366 | D1 | 9.000000 | 35.000000 K | ACRYLIC | * |
| S2A | −412.006124 | D2 | 50.000000 | 35.000000 K* | AIR | * |
| S3 | −250.000000 | | −50.000000 | 33.000000 K* | REFL_HATCH | * |
| S2B | −412.006124 P | | 50.000000 | 10.000000 REFLECT | | |
| | — | D3 | 72.658 | 6.070000 A | AIR | |

*CONIC

| SRF | CC |
|---|---|
| S1 | 29.4933924 |
| S3 | 3.187421 |

ASPHERIC SURFACE DATA - S1

$$SAG(r) = \frac{CV \cdot r^2}{1 + \sqrt{1 - (1-K)(1-CV^2 r^2)}} + AS2 \cdot r^4 + AS3 \cdot r^6 + AS4 \cdot r^8 + AS5 \cdot r^{10} \quad (1)$$

AS2 - 4.1039e − 08
AS3 - 9.4617e − 12
AS4 - 2.1873e − 15
AS5 - 9.8471e − 19

DIFFRACTIVE SURFACE DATA

| DF1 | −4.5755e − 6 | DF2 | 6.4107e − 09 | DF3 | 03.0774e − 12 |
|---|---|---|---|---|---|
| DF4 | 1.1547e − 15 | DF5 | −1.3508e − 19 | | |

$$\phi(r) = \frac{1}{\lambda_{WV1}} \sum_{i=1}^{i=5} DF_i \cdot r^{2i} \quad (2)$$

WAVELENGTHS

| DESIGN | | |
|---|---|---|
| WV1 | WV2 (BLU) | WV3 (RED) |
| 0.546100 | 0.486130 | 0.656270 |

REFRACTIVE INDICES

| SRF | MATL | RN1 | RN2 | RN3 | VNBR |
|---|---|---|---|---|---|
| S0 | AIR | 1.000000 | 1.000000 | 1.000000 | |
| S1 | ACRYLIC | 1.493778 | 1.497766 | 1.489196 | 57.617036 |
| S2 | AIR | 1.000000 | 1.000000 | 1.000000 | |
| S3 | REFL_HATCH | 1.000000 | 1.000000 | 1.000000 | |
| S2B | REFLECT | 1.000000 | 1.000000 | 1.000000 | |
| D3 | AIR | 1.000000 | 1.000000 | 1.000000 | |

*PARAXIAL CONSTANTS - REAL RAY BASED

| Effective focal length: | 199.454631 |
|---|---|
| Gaussian image height: | 20.444101 |
| Working F-number: | 5.982443 |
| Petzval radius: | 309.027423 |
| Paraxial invariant: | −1.708675 |

From the foregoing description, it will be apparent that there has been provided an improved catadioptric lens system, and particularly a camera incorporating the system as an integral part thereof variations and modifications in the herein described system, including other designs in accordance with the invention, will undoubtedly suggest themselves to those skilled in the art.

camera body, said curved section having a reflective coating, said reflective third surface also having a clear aperture centered on said axis, said reflective third surface facing and being spaced from said second surface, said second surface having inner and outer portions which are a light reflective and transmissive respectfully, the curvatures of (i) said reflective third surface, (ii) said inner portion, (iii) said first surface, (iv) said outer portion of said second surface, and diffraction in said achromat defining a focus of said lens system along said optical axis spaced in said second direction from said body.

2. The combination according to claim 1, wherein said camera body encloses a film plane generally perpendicular to said optical axis and passing through said focus.

3. The combination according to claim 2, wherein said third surface is a metallized portion of an outer surface of the camera body.

4. The combination according to claim 2, wherein said camera body having said reflective surface is made of plastic.

5. The combination according to claim 1, wherein said first surface is a refractive surface and said second surface includes a diffractive surface.

6. The combination according to claim 5, wherein said diffractive surface has a plurality of zones radially spaced from said optical axis.

7. The combination according to claim 6, wherein said zones are disposed on said outer portion of said second surface and said refractive/diffractive achromat is a singlet.

8. The combination according to claim 7, wherein said second surface has a curvature which is different from said first surface which directs rays reflected at said third surface to said focus.

9. The combination according to claim 1, wherein said first surface is a refractive aspheric surface.

10. A single use photographic camera comprising a camera body and a film for capturing an image, said camera body at least partially enclosing an optical system having an achromatic lens component, wherein a section of said camera body has an optical surface with optical power and said optical surface faces said achromatic lens component, and said achromatic lens component and said optical surface, in combination, produce an image on said film.

11. A photographic camera according to claim 10, wherein said optical surface is a reflective surface.

12. A photographic camera according to claim 11, wherein said optical surface constitutes a primary mirror.

13. A photographic camera according claim 11, wherein said lens component is a refractive/diffractive achromat having first and second surfaces facing in first and second directions which are opposite to each other along an optical axis, said second surface having inner and outer portions which are a light reflective and transmissive respectfully;

said reflective surface facing and being spaced from said second surface; and the curvatures of (i) said reflective third surface, (ii) said inner portion, (iii) said first surface, (iv) said outer portion of said second surface, and diffraction in said achromat defining a focus of said lens system along said optical axis spaced in said second direction from said body.

* * * * *